Sept. 9, 1969   H. J. ANDREWS   3,466,072
BUILDING CONSTRUCTIONS AND FASTENERS THEREFOR
Filed Dec. 9, 1966
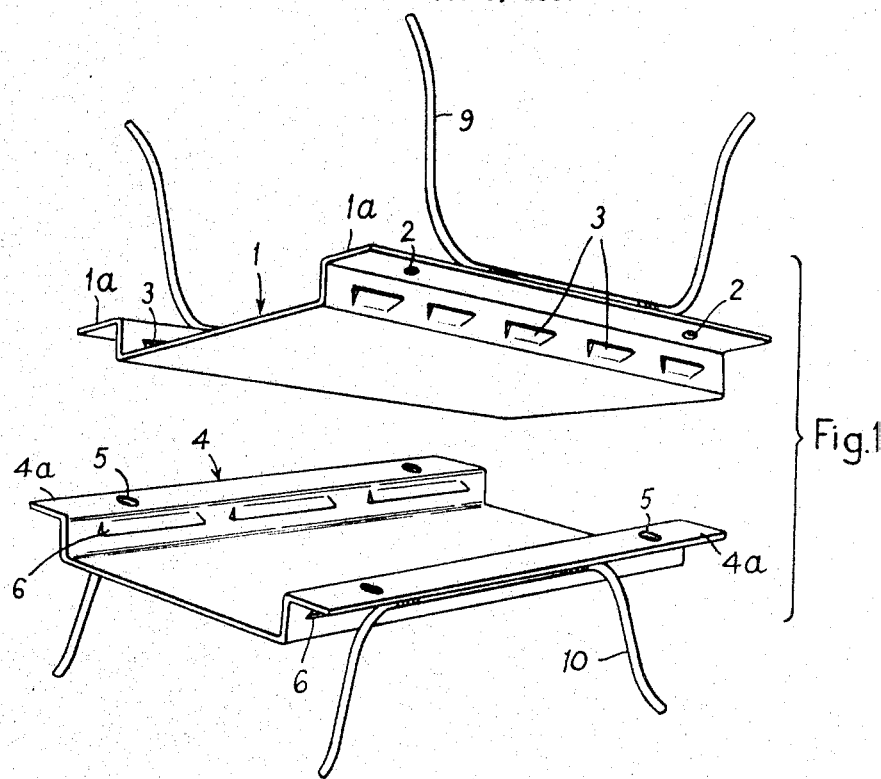
Fig.1
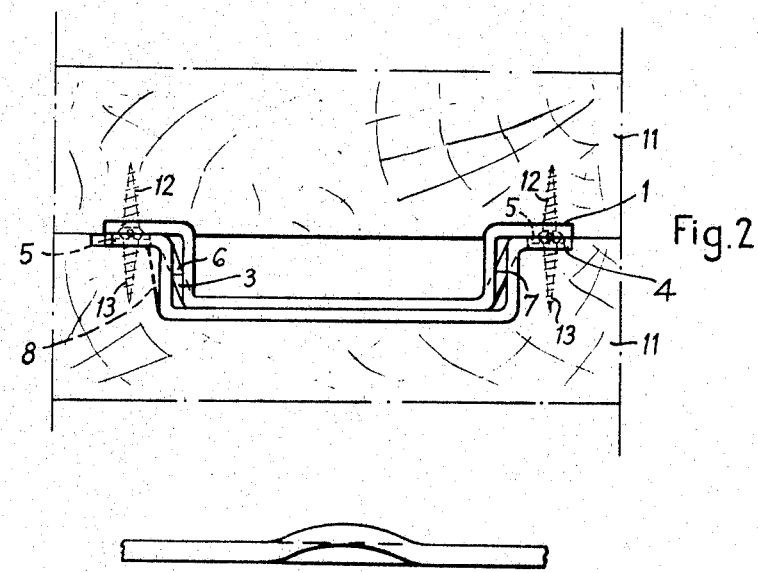
Fig.2
Fig.3

United States Patent Office 3,466,072
Patented Sept. 9, 1969

3,466,072
BUILDING CONSTRUCTIONS AND
FASTENERS THEREFOR
Harold John Andrews, Brandfold, Durrington Hill,
Worthing, Sussex, England
Filed Dec. 9, 1966, Ser. No. 600,463
Claims priority, application Great Britain, Dec. 13, 1965,
52,917/65
Int. Cl. F16b 5/00, 7/00, 9/00
U.S. Cl. 287—20.92                          4 Claims

ABSTRACT OF THE DISCLOSURE

This invention discloses fasteners and building constructions incorporating same. The fastener disclosed comprises a first fastener member for fixing to one building component and having a groove, a second fastener member for fixing to another building component to be joined in abutting relationship to said one building component and having a tongue receivable in said groove, and cooperating projections on both fastener members whereby when the tongue of said second fastener member is pressed into the groove of said first fastener member the projections on each said fastener members inter-engage so positively interlocking the two fastener members and preventing separation thereof in the direction opposite to that for their engagement.

This invention relates to building constructions and to fasteners for joining finished panel components in industrialised building systems so that the panels interlock upon being pressed together.

The advent of industrialised building systems has presented problems of interconnection between completed building components, such as panels, particularly where finishes are applied to both the external and internal faces of the panels, during fabrication, so as to minimise site work. This means that it is not usually possible to cut or otherwise work on the panels in order to achieve a satisfactory connection between the panels without disturbing the finished surfaces. None of the ways existing at present for joining panels are entirely without surface disturbance of some kind or visible signs of the existence of the joint, such as cover strips or the like used for masking the joint. In addition, existing types of connection require an operation of some kind, such as screwing, turning, bolting etc., to lock the joint. Most of the existing types of joint were originally developed for prefabricated constructions which could be dismantled. However, the present requirements in industrialised building are for a simple, permanent joint which can be effected quickly with little or no requirement for demountability and it is an object of this invention to provide such a joint.

From one aspect, the invention consists in a building construction comprising two or more building components, such as wall panels, which are joined together in abutting relationship by means of complementary fastener members fixed to the components before they are joined and which are interlocked to join the components by pressing together the components to be joined. The joint between two components may be given a desired strength according to the number of fastener members disposed along the joint.

From another aspect, the invention consists in a fastener for joining building components, such as wall panels, comprising a pair of complementary fastener members which interlock when pressed together and which are adapted to be fixed respectively to two components which abut each other when joined.

Preferably the components are grooved or otherwise recessed to receive the whole or a part of the fastener members. Of course the fasteners will usually be fixed to the edges of the components which are then joined together with their horizontal and/or vertical edges abutting. However, it will be appreciated that other arrangements may sometimes be required. For example, it may be desired to fix the end of one component to one of the faces of another component such as when constructing a partition.

In a preferred form of fastener according to the invention the fastener members comprise complementary channel members which are so fixed to the edges of the components which abut each other when joined that one of them forms a tongue which is receivable in a groove formed by the other, notches or projections being provided on the side walls of these channel members which, when the components are pressed together, interlock and prevent the channel members from being disunited. With this construction of fastener, bending strength can be developed by the nature of the joint which permits a small lever arm action across the width of the channel section.

In order that the invention may be more readily understood, reference will now be made to the accompanying drawing, in which:

FIGURE 1 is a perspective view of an embodiment of fastener according to the invention showing the two fastener members separated, FIGURE 2 is a section through the fastener shown in FIGURE 1 with the fastener members in engagement, details of wall panels to which these members are joined being shown by broken lines, and FIGURE 3 is a detail of one form of projection used for interlocking the fastener members.

Referring to the drawing, a fastener according to the invention comprises a male channel member 1 of metal and a female channel member 2, also of metal. The channel member 1 is adapted to be fixed to the edge of a component so that it forms a nose or tongue which is receivable in a groove formed by the channel member 4 when the latter is fixed to the abutting edge of a component.

The members 1 and 4 have outwardly extending flanges 1a and 4a in which are provided holes 2 and 5 respectively for receiving screws for fixing them to the edges of timber components. Alternatively, tags 9 and 10 respectively may be secured to the flanges 1a and 4a respectively for casting into the edges of concrete components during fabrication of the latter. It should be realised that the members 1 and 4 will not normally be provided both with holes and tags and that these have both been shown in FIGURE 1 for the purposes of illustration only. The holes 5, when provided, are elongated or slotted laterally to allow the female member 4 to expand slightly as the male member 1 is pressed into engagement therewith, as described below.

The side walls of the channels of both fastener members 1 and 4 are provided with notches or projections 3 and 6 respectively. In the illustrated embodiment, these projections are formed by cutting longitudinal slits at intervals along the length of the fastener members and pressing out the projections on one side of these slits. As will be seen from the drawing, the projections 3 are pressed outwardly on the side of the slits adjacent the bottom of the channel member 1 and the projections 6 are pressed inwardly on the side of the slits adjacent the mouth of the channel member 4. The form of the projections 3 and 6 is shown enlarged in FIGURE 3. Preferably the number of projections 3 will be different from the number of projections 6, as shown. With this arrangement the projections will interlock even though the fastener members may be mis-aligned.

Referring now particularly to FIGURE 2, the fastener members 1 and 4 are shown fixed in machined grooves in the edges of two wooden panels 11 at corresponding locations by means of screws 12, 13 in the holes 2 and 5 respectively. The panels 11 are joined together by pressing them into abutting relationship as shown. As the fastener members 1 and 4 engage, the slotted holes 5 allow the female member to expand to the position shown by the dotted line 8 while the projections 3 and 6 override, and when the fastener members are fully engaged the female members snaps back again so that the projections 3 and 6 assume the interlocking relationship shown. The fastener members cannot now be disunited simply by pulling them apart.

It will be appreciated that by varying the thickness of the metal channel members and form of connections to the panels, a fastener according to this invention could be used to join concrete panels together, concrete panels to timber panels, and timber panels together. It will also be appreciated that when the fastener members are fixed to their respective components, their location is not critical. Their location is also not critical in the case where equal numbers of projections are provided on the two fastener members, except within the limits defined by the lengths of the projections on these members. Further, a simple weatherproofing material used in conjunction with a fastener according to the invention is all that is required to provide resistance to weather conditions.

The invention has been described only by way of example and various modifications may be made to the details referred to herein. Thus, the fastener members may be made of other materials besides metal, for example reinforced plastics materials.

I claim:

1. In a building construction of the kind in which at least two building components, such as wall panels, are joined together in abutting relationship, the improvement comprising complementary fastener members fixed to the components before they are joined, and consisting of a first fastener member having a groove and fixed in a recess in one of two components to be joined, said recess being wider than said groove, so that said groove may be laterally expanded within said recess, and a second fastener member fixed to the other component and having a tongue receivable in said groove, said fastener members having cooperating means comprising projections on said first fastener member extending inwardly of said groove from opposite sides thereof and having longitudinal edges facing the bottom of said groove, and projections on said second fastener member extending outwardly of said tongue from opposite sides thereof and having longitudinal edges facing the base of said tongue; whereby when the tongue of said second fastener member is pressed into the groove of said first fastener member said groove is laterally expanded as the projections on the two members pass by each other, after which said grooved member snaps back to its original position and the longitudinal edges on the projections on each said member engage behind the longitudinal edges of the projections on the other member, thus positively interlocking the two fastener members and preventing separation thereof in the direction opposite to that of their engagement.

2. A building construction as defined in claim 1, wherein the number of said projections on one of said fastener members is greater than the number of said projections on the other fastener member, the projections on said one member being shorter than the projections on the other member.

3. A building construction as claimed in claim 1, in which each grooved member comprises a base portion, side wall portions extending along opposite longitudinal edges of the base portion and outwardly extending flanges along said side wall portions, and means associated with said flanges for facilitating the fixing of said grooved member to the respective components.

4. A building construction as claimed in claim 3, in which said grooved members are made from sheet metal, and wherein said projections are struck out of said side walls of the grooved members.

References Cited

UNITED STATES PATENTS

| | | | |
|---|---|---|---|
| 1,067,172 | 7/1913 | Holub | 285—319 |
| 1,297,591 | 3/1919 | Prescott | 285—319 |
| 1,661,674 | 3/1928 | Osborn | 285—319 |
| 2,537,284 | 1/1951 | Schuden | 285—319 |
| 2,142,305 | 1/1939 | Davis | 52—589 |
| 2,577,248 | 12/1951 | James | 287—189.36 |
| 2,658,241 | 11/1953 | Houghton. | |

EDWARD C. ALLEN, Primary Examiner